United States Patent
Liu et al.

(10) Patent No.: US 11,500,978 B2
(45) Date of Patent: Nov. 15, 2022

(54) PASSWORD UPDATES

(71) Applicant: Hewlett-Packard Development Company, L.P., Spring, TX (US)

(72) Inventors: Wei Ze Liu, Spring, TX (US); Rosilet Retnamoni Braduke, Spring, TX (US); Lan Wang, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 73 days.

(21) Appl. No.: 16/982,198

(22) PCT Filed: Jul. 31, 2018

(86) PCT No.: PCT/US2018/044505
§ 371 (c)(1),
(2) Date: Sep. 18, 2020

(87) PCT Pub. No.: WO2020/027791
PCT Pub. Date: Feb. 6, 2020

(65) Prior Publication Data
US 2021/0365546 A1 Nov. 25, 2021

(51) Int. Cl.
*G06F 21/46* (2013.01)
(52) U.S. Cl.
CPC .................... *G06F 21/46* (2013.01)
(58) Field of Classification Search
CPC ..................................................... G06F 21/46
See application file for complete search history.

(56) References Cited

U.S. PATENT DOCUMENTS

| | | | | |
|---|---|---|---|---|
| 5,963,142 A * | 10/1999 | Zinsky | ............... | G06F 12/1433 726/19 |
| 6,006,333 A | 12/1999 | Nielsen | | |
| 6,079,021 A | 6/2000 | Abadi et al. | | |
| 6,141,760 A * | 10/2000 | Abadi | ................ | G06F 21/46 713/184 |
| 6,275,944 B1 * | 8/2001 | Kao | .................. | G06F 21/41 726/36 |
| 6,629,246 B1 * | 9/2003 | Gadi | ................. | H04L 63/083 726/28 |

(Continued)

FOREIGN PATENT DOCUMENTS

| | | |
|---|---|---|
| CN | 107818272 | 3/2018 |
| JP | 2004078539 | 3/2004 |

OTHER PUBLICATIONS

Horsch, M., Hülsing, A. and Buchmann, J., 2015, August. PALPAS—PAssword Less PAssword Synchronization. In 2015 10th International Conference on Availability, Reliability and Security (pp. 30-39). IEEE. (Year: 2015).*

*Primary Examiner* — James R Turchen
(74) *Attorney, Agent, or Firm* — HPI Patent Department

(57) ABSTRACT

Examples associated with password updates are described. One example method includes receiving a request to modify an administrator password in a basic input/output system (BIOS). The administrator password may be updated. A first password tied to the administrator password may be identified. A first updated password is generated by concatenating a character string to the administrator password. The character string may be generated based on a password policy for the first password. The first password may then be updated to the first updated password.

14 Claims, 6 Drawing Sheets

(56) References Cited

U.S. PATENT DOCUMENTS

| | | | | |
|---|---|---|---|---|
| 6,633,976 | B1* | 10/2003 | Stevens | G06F 9/4401 |
| | | | | 713/2 |
| 6,647,498 | B1* | 11/2003 | Cho | G06F 21/31 |
| | | | | 713/184 |
| 6,665,800 | B1* | 12/2003 | Jaber | G06F 21/34 |
| | | | | 726/19 |
| 7,231,513 | B1* | 6/2007 | Eydelberg | G06F 21/31 |
| | | | | 713/166 |
| 7,788,717 | B2 | 8/2010 | Merkin | |
| 7,809,950 | B2 | 10/2010 | Hawk et al. | |
| 8,548,916 | B2* | 10/2013 | Ohkado | G06F 21/33 |
| | | | | 726/28 |
| 9,667,416 | B1* | 5/2017 | Machani | H04L 9/3215 |
| 11,321,448 | B1* | 5/2022 | Sanchez | H04L 9/3236 |
| 2003/0208696 | A1 | 11/2003 | Piwonka et al. | |
| 2004/0044896 | A1* | 3/2004 | Kelley | G06F 21/46 |
| | | | | 726/6 |
| 2005/0005173 | A1* | 1/2005 | Moffat | G06F 21/46 |
| | | | | 726/19 |
| 2005/0132203 | A1* | 6/2005 | Dharmarajan | G06F 21/46 |
| | | | | 726/19 |
| 2005/0246512 | A1 | 11/2005 | Inoue | |
| 2006/0259782 | A1* | 11/2006 | Wang | G06F 21/6245 |
| | | | | 713/189 |
| 2007/0005951 | A1 | 1/2007 | Davis et al. | |
| 2007/0028299 | A1* | 2/2007 | Albano | G06F 21/46 |
| | | | | 726/5 |
| 2008/0066167 | A1* | 3/2008 | Andri | G06F 21/31 |
| | | | | 726/5 |
| 2008/0263642 | A1* | 10/2008 | Jerez | G06F 21/34 |
| | | | | 726/6 |
| 2010/0174758 | A1* | 7/2010 | Radenkovic | G06F 21/41 |
| | | | | 707/E17.005 |
| 2013/0269010 | A1* | 10/2013 | Wheeler | G06F 21/46 |
| | | | | 726/6 |
| 2014/0173267 | A1 | 6/2014 | Chiu | |
| 2014/0282939 | A1 | 9/2014 | Pieczul et al. | |
| 2014/0317705 | A1* | 10/2014 | Eluard | G06F 21/31 |
| | | | | 726/6 |
| 2014/0337946 | A1 | 11/2014 | Jancula et al. | |
| 2015/0067760 | A1* | 3/2015 | Waltermann | G06F 21/6218 |
| | | | | 726/1 |
| 2016/0028714 | A1* | 1/2016 | Umberger | G06F 21/44 |
| | | | | 726/18 |
| 2017/0091441 | A1 | 3/2017 | Moore et al. | |
| 2017/0168851 | A1 | 6/2017 | Lin | |
| 2017/0185780 | A1* | 6/2017 | Kao | H04L 63/102 |
| 2018/0004934 | A1 | 1/2018 | Venkataramani | |
| 2018/0285558 | A1* | 10/2018 | Neumann | H04W 12/068 |
| 2020/0036705 | A1* | 1/2020 | Lee | G06F 16/27 |

* cited by examiner

PASSWORD UPDATES

BACKGROUND

A basic input/output (BIOS) system of a computer is processor executable instructions used by the computer to perform various initialization functions and provide runtime services for the computer such as controlling hardware attached to the computer. The BIOS is typically the first instructions initiated by the computer when it is powered on, making it particularly desirable to protect from malicious attacks. In some instances, portions of the BIOS may be sourced from different manufacturers of components of the computer.

BRIEF DESCRIPTION OF THE DRAWINGS

The present application may be more fully appreciated in connection with the following detailed description taken in conjunction with the accompanying drawings.

DETAILED DESCRIPTION

Figure 1:
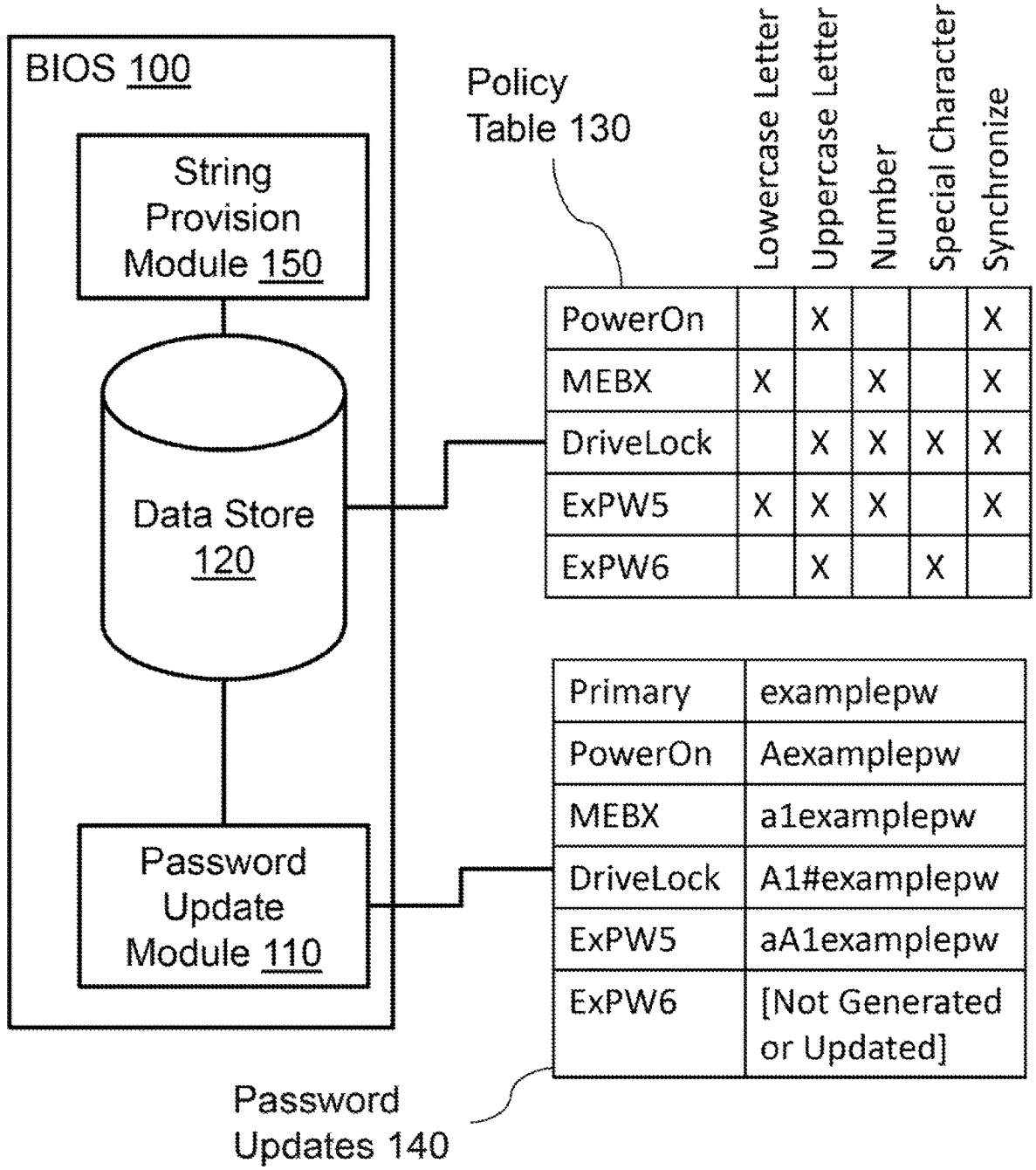
FIG. 1 illustrates an example BIOS associated with password updates.

Examples associated with password updates are described. As discussed above, a basic input/output system (BIOS) of a computer may have portions that were created by a variety of manufacturers. These manufacturers may have differing security controls associated with their portions of the BIOS. These security controls may include, for example, limiting what changes can be made to the portions, limiting access to the portions, and so forth. In some examples, the portions may use different passwords to protect themselves, and these portions may in turn have different password policies dictated by the producers of the portions. For example, a first password policy may seek an uppercase letter, and a number, while a different password may seek a special character. Having different passwords for different components of the BIOS may be difficult for a user to remember, especially if the user does not regularly make changes to the BIOS.

Consequently, it may be desirable to use a BIOS level password manager to generate passwords for components of the BIOS based on a primary or administrator password for the BIOS. When a user sets the primary password, passwords that have been configured to be synchronized to the primary password may be concatenated with a set of characters that are selected based on the password policy for that password. Even if the set of characters concatenated with the primary password is known, assuming the primary password is not compromised, the passwords synchronized to the primary password may be similarly secure. This may be true even if a user seeking to access a resource secured by a synchronized password is explicitly or silently provided with the prefix used to generate the synchronized password.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to hardware, instructions stored on a computer-readable medium or in execution on a machine, and/or combinations of each to perform a function(s) or an action(s), and/or to cause a function or action from another module, method, and/or system. A module may include a microprocessor controlled via instructions executable by the microprocessor, a discrete module, an analog circuit, a digital circuit, a programmed module device, a memory device containing instructions, and so on. Modules may include gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

FIG. 1 illustrates an example BIOS 100 of a computer associated with password updates. BIOS 100 includes a password update module 110 connected to a data store 120. Password update module 110 and data store 120 in combination may be responsible for managing passwords for a variety of components of BIOS 100. Datastore 120 stores a policy table 130. Datastore 120 may also store a set of passwords for the components of BIOS 100. In other examples, the passwords may be stored in other components of the computer and/or BIOS 100. In some examples BIOS 100 may be implemented using the unified extensible firmware interface (UEFI).

Policy table 130 may describe a set of password policies for portions of BIOS 100 in addition to other information about those policies. The password policies may describe characters that are checked for by a logic responsible for verifying and/or approving a password submitted for their respective portions. By way of illustration, in this example, a power on password may check for at least one uppercase letter in the password, and the drive lock password may check for at least one uppercase letter, number, special character, and so forth. Other password policies may include, for example, restricted characters, rules for consecutive characters, and so forth. Policy table 130 also includes data describing whether a password should be synchronized to a primary password of BIOS 100. The primary password may be an administrator password of BIOS 100. Synchronizing a password to the primary password may preclude the password from being updated without first modifying the synchronization setting, and may ensure that the synchronized password is generated based on the primary password.

When a user seeks to update the primary password, password update module 110 may generate a password for each synchronized password. This process is illustrated in the table 140 showing password updates. It should be appreciated that BIOS 100 may maintain these passwords within multiple tables or in plain text for short period of time. Instead, after generating the passwords, a one way hash may be applied to encrypt the passwords to ensure a malicious entity cannot access the plain text passwords. Password update module 110 may generate the passwords by concatenating the primary password with a character string generated based on a respective password policy. For example, the password policy for the management engine BIOS extension (MEBX) password seeks a password including a lowercase letter and a number. Thus, the password update module may concatenate the characters "a1" to the primary password to generate a MEBX password that conforms to the password policy specified by the MEBX BIOS portion. This password may then be encrypted, as discussed above, and stored. Passwords not synchronized, such example password 6 (ExPW6) may not have their password generated and/or updated.

BIOS 100 also includes a string provision module 150. String provision module 150 may provide character strings to users seeking to access resources associated with passwords managed using techniques disclosed above. String provision module 150 may provide character strings explicitly, passively, and so forth. For example, string provision module 150 may explicitly insert the character string in a text field into which a password is to be entered by the user. In other examples, string provision module may passively concatenate the character string to the password prior to verifying that the password has been entered. In other examples, string provision module 150 may tell a user the character string or the password policy so that the user may include the character string with the password to complete authentication.

In other examples, password update module 110 may ensure that a password change complies with password policies in other ways. For example, a password policy may reject password strings containing a certain number of consecutive characters, complies with password reuse rules, and so forth. Thus, password update module may perform these types of verification prior to accepting a password update to the primary password.

While some examples herein describe generating and concatenating fixed character strings based on the password policy to the administrator password. In other examples, a random string of characters selected based on the password policy may be concatenated instead. The random characters may vary within character sets, in terms of ordering prior to concatenation, in terms of the number of characters appended, and so forth. By way of illustration, some randomly generated character strings for a password policy that specifies a lowercase letter, an uppercase letter, and a number may include, for example: "m6L", "L91bE", "4mEb1ee", and so forth. When random character strings are used, the character strings may be stored securely within BIOS 100 to allow them to be retrieved at a later point of time, such as when string provision module 150 seeks to provide the character strings to a user.

Figure 2:
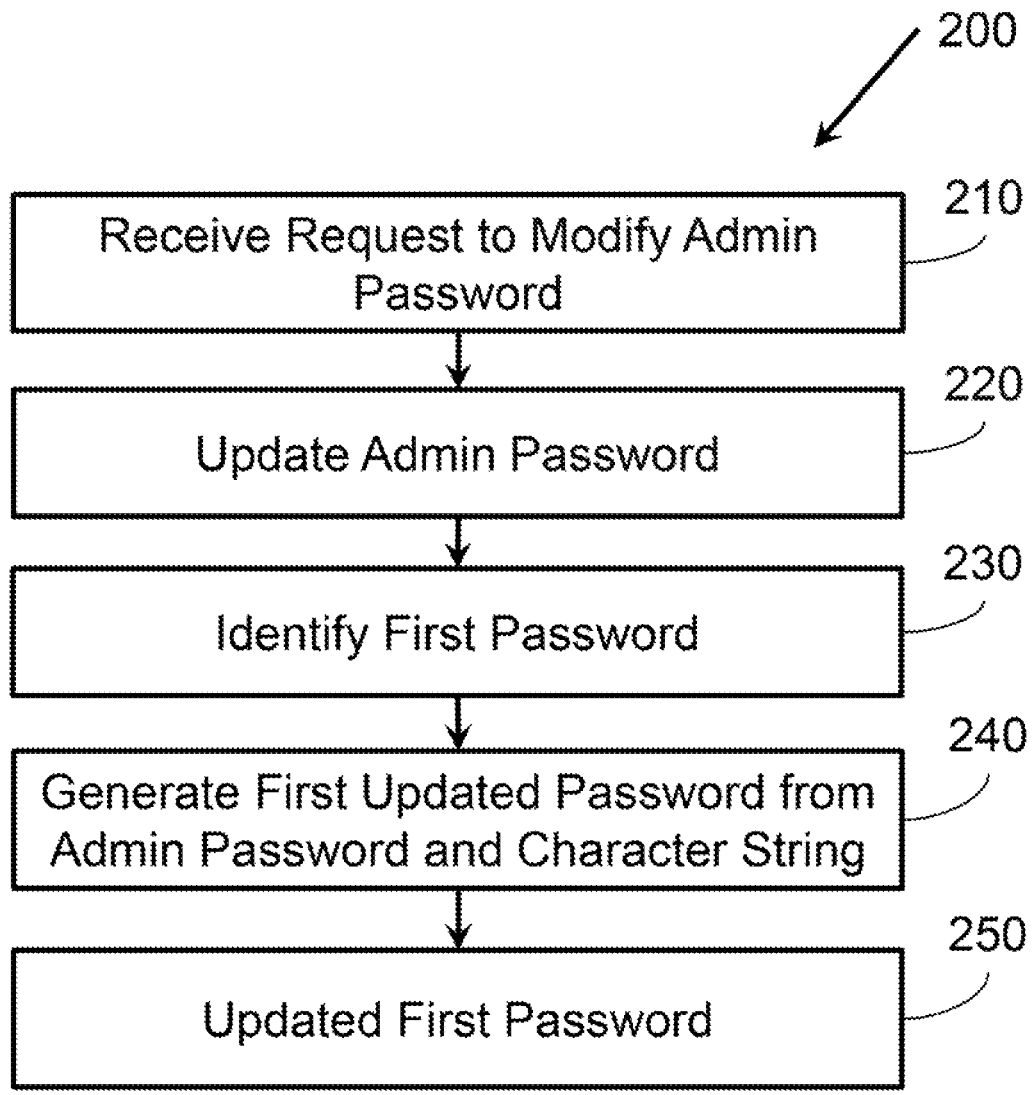
FIG. 2 illustrates a flowchart of example operations associated with password updates.

FIG. 2 illustrates an example method 200. Method 200 may be embodied on a non-transitory processor-readable medium storing processor-executable instructions. The instructions, when executed by a processor, may cause the processor to perform method 200. In other examples, method 200 may exist within logic gates and/or RAM of an application specific integrated circuit (ASIC).

Method 200 may perform various tasks associated with password updates. Method 200 includes receiving a request to modify an administrator password at 210. The request to modify the administrator password may be received in a basic input/output system (BIOS) of a device. The request may include a character string that a user seeks to use to update the administrator password.

Method 200 also includes updating the administrator password at 220. Updating the administrator password may involve performing some type of encryption on the administrator password received at action 210 (e.g., using a hash function). The encrypted password may then be stored so that in the future, when a password is entered, it may be re-encrypted using the same function and compared to the stored value.

Method 200 also includes identifying a first password at 230. The first password may be tied to the administrator password. The first password may be associated with, for example, a power on password, a management engine BIOS extension password, a drive lock password, and so forth. In some examples, the first password may be tied to the administrator password based on a flag stored in association with the first password that signals that the first password should be maintained based on the administrator password.

Method 200 also includes generating a first updated password at 240. The first updated password may be generated by concatenating a character string to the administrator password. The character string may be generated based on a password policy for the first password. The character string may be concatenated as a prefix, a postfix, and so forth. The character string may be programmatically generated, randomly generated, and so forth.

Method 200 also includes updating the first password at 250. The first password may be updated to the first updated password. In various examples, updating the first password may include storing an encrypted version of the first updated password in a secure storage. The encrypted version may facilitate verification of future access attempts involving the first password.

Figure 3:
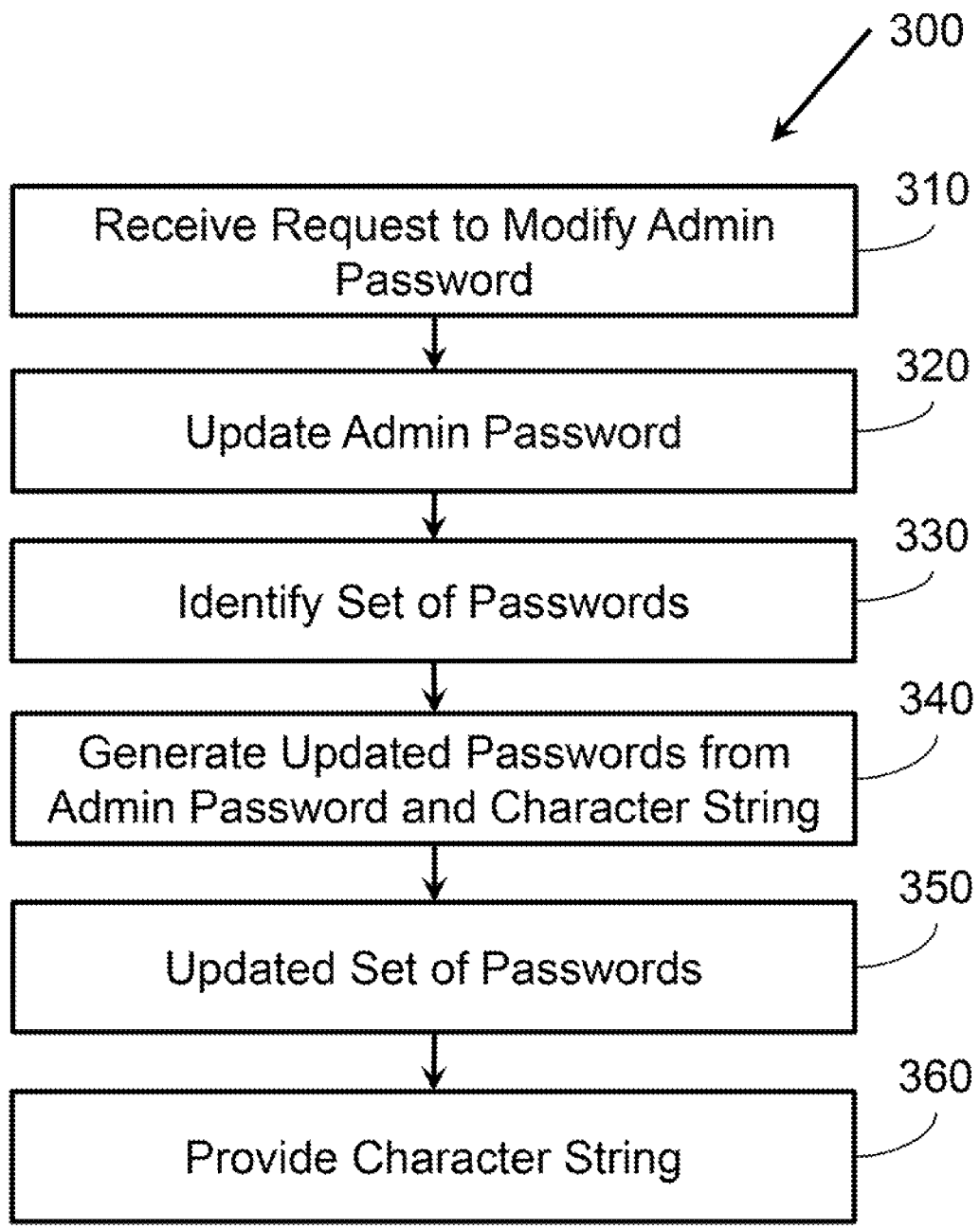
FIG. 3 illustrates another flowchart of example operations associated with password updates.

FIG. 3 illustrates a method 300 associated with password updates. Method 300 includes several actions similar to those described above reference to method 200 (FIG. 2). For example, method 300 includes receiving a request to modify an administrator password at 310, and updating the administrator password at 320.

Method 300 also includes identifying a set of passwords at 330. The set of passwords may include a first password as described above with reference to method 200. The set of passwords may be identified by a security policy. The security policy may specify a list of passwords that should be kept tied to the administrator password. Thus, method 300 may facilitate updating each member of the set of passwords.

Updating the set of passwords may include generating a set of updated passwords at 340. Members of the set of updated passwords may be generated by concatenating respective character strings to the administrator passwords. The respective character strings may be generated based on respective password policies for the members of the set of passwords. The members of the set of passwords may then be updated at 350 to corresponding updated passwords.

Method 300 also includes providing the character string at 360. The character string may be provided upon detecting an attempt to access a resource secured by the first password. Providing the character string may facilitate granting access to the resource. The character string may be provided by, for example, silently concatenating the character string with an entered password, providing a user with a reminder of a password policy associated with the first password, initializing a text entry field with the character string, and so forth.

Figure 4:
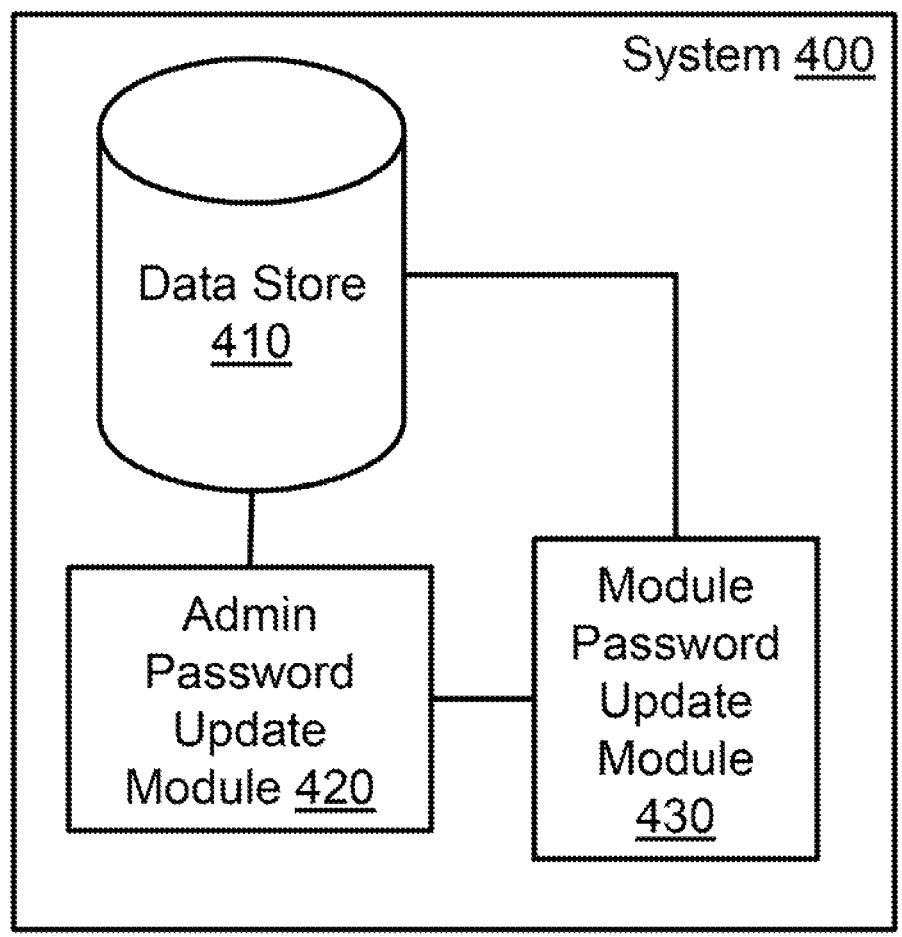
FIG. 4 illustrates an example system associated with password updates.

FIG. 4 illustrates a system 400 associated with password updates. System 400 includes a data store 410. Data store 410 may store password metadata for a set of module passwords. Members of the set of module passwords may control access to a respective set of basic input/output system (BIOS) modules. The password metadata may include password policies for the passwords. The password metadata may also include synchronization settings for the members of the set of module passwords. The synchronization settings may Indicate which members of the set of module passwords should be synchronized to the administrator password.

System 400 also includes an administrator password update module 420. Administrator password update module 420 may facilitate modification of an administrator password of the BIOS. Thus, administrator password update module may allow for modifying the administrator password to a new password requested by a user according to security rules specified in the BIOS.

System 400 also includes a module password update module 430. Module password update module 430 may change members of the set of module passwords to the administrator password concatenated with character strings. This may be completed, for example, after the administrator password has been updated by administrator password update module 420. The character strings may be generated based on password polices associated with respective module passwords. By way of illustration, a password policy specifying that a password include a special character and a number may cause the character string "i" to be concatenated with the administrator password. In various examples, module password update module 430 may select members of the set of module passwords to change based on synchronization settings stored in data store 410.

Figure 5:
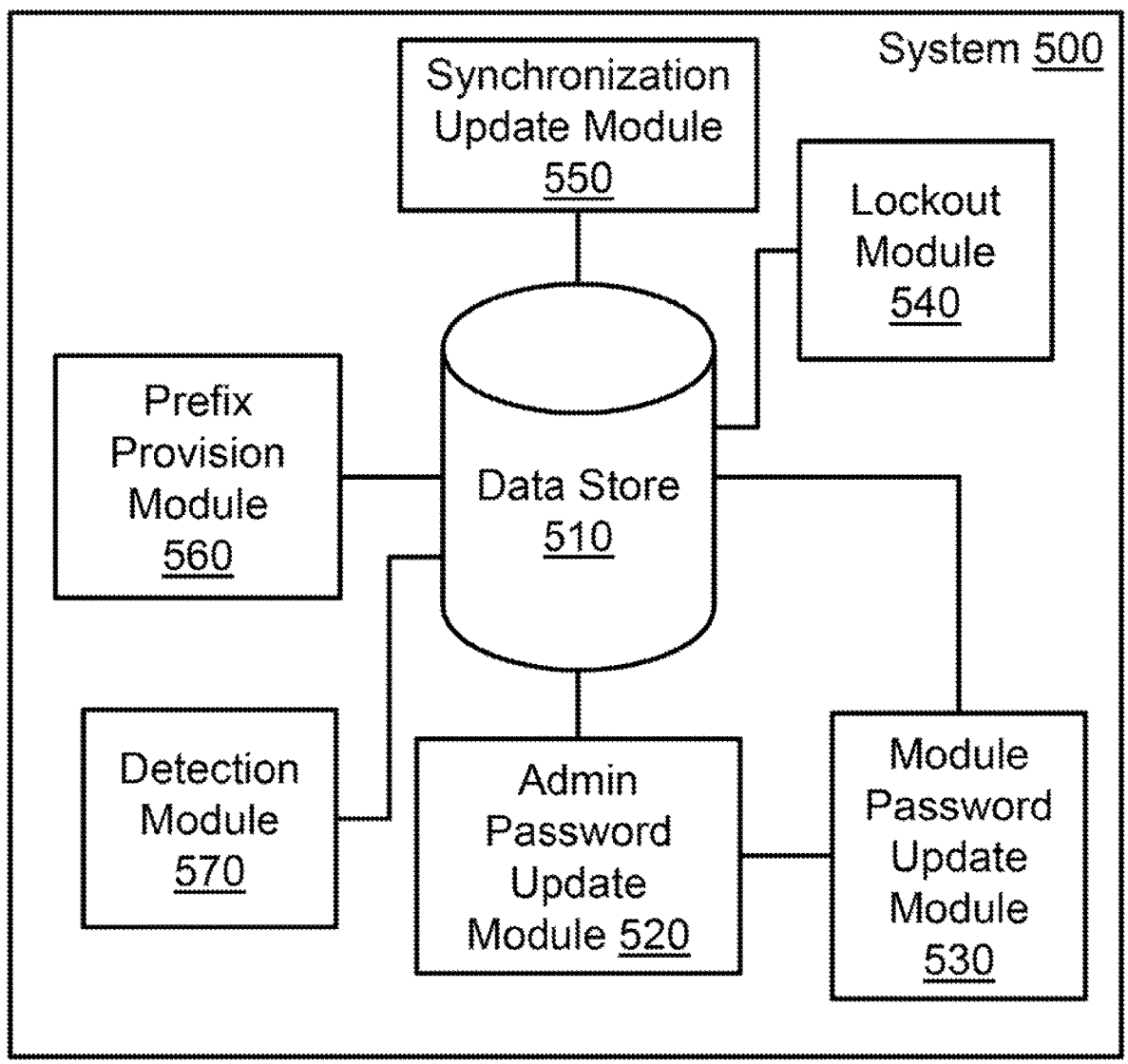
FIG. 5 illustrates another example system associated with password updates.

FIG. 5 illustrates a system 500 associated with password updates. System 500 includes several items described above with reference to system 400 (FIG. 4). For example, system 500 includes a data store 510, an administrator password update module 520, and a module password update module 530.

System 500 also includes a lockout module 540. Lockout module 540 may prevent modification of members of the set of module passwords that are indicated as being synchronized to the administrator password by synchronization settings stored in data store 510.

System 500 also includes a synchronization update module 550. Synchronization update module 550 may allow a user to adjust which members of the set of module passwords should be synchronized to the administrator password.

System 500 also includes a prefix provision module 560. Prefix provision module 560 may detect when a user is seeking to access a BIOS module protected by a member of the set of module passwords. When a user is so detected, prefix provision module 560 may provide the user with a provided character string. The provided character string may be generated based on password policies associated with the member of the set of module passwords. The provided character string may be provided by, for example, silently concatenating the provided character string with an entered password, providing a user with a reminder of a password policy associated with the member of the set of module passwords, and initializing a text entry field with the provided character string, and so forth.

System 500 also includes a detection module 570 to detect installation of a new BIOS module having a module password. Detection module 570 may then generate password metadata associated with the new BIOS module.

Figure 6:
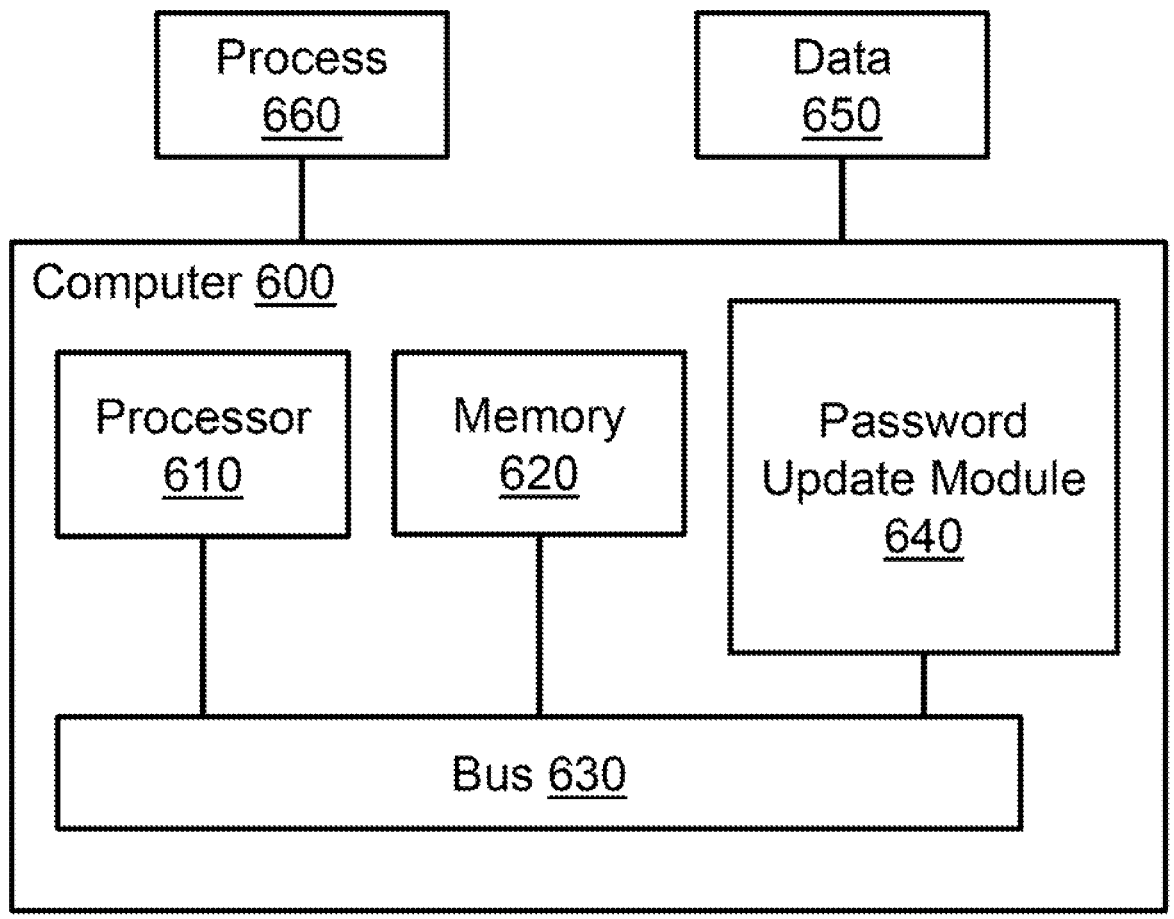
FIG. 6 illustrates an example computing device in which example systems, and methods, and equivalents, may operate.

FIG. 6 illustrates an example computing device in which example systems and methods, and equivalents, may operate. The example computing device may be a computer 600 that includes a processor 610 and a memory 620 connected by a bus 630. Computer 600 includes a password updates module 640. Password updates module 640 may perform, alone or in combination, various functions described above with reference to the example systems, methods, and so forth. In different examples, password updates module 640 may be implemented as a non-transitory computer-readable medium storing processor-executable instructions, in hardware, as an application specific integrated circuit, and/or combinations thereof.

The instructions may also be presented to computer 600 as data 650 and/or process 660 that are temporarily stored in memory 620 and then executed by processor 610. The processor 610 may be a variety of processors Including dual microprocessor and other multi-processor architectures. Memory 620 may include non-volatile memory (e.g., read-only memory, flash memory, memristor) and/or volatile memory (e.g., random access memory). Memory 620 may also be, for example, a magnetic disk drive, a solid state disk drive, a floppy disk drive, a tape drive, a flash memory card, an optical disk, and so on. Thus, memory 620 may store process 660 and/or data 650. Computer 600 may also be associated with other devices including other computers, devices, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method, comprising:
   receiving, in a basic input/output system (BIOS), a request to modify an administrator password;
   updating the administrator password;
   identifying a first password of a first component of the BIOS tied to the administrator password;
   generating first password metadata comprising a password policy for the first password associated with the first component;
   generating a first updated password by concatenating a character string to the administrator password, where the character string is generated based on the password policy for the first password;
   updating the first password to the first updated password;
   detecting installation of a second component of the BIOS having a second password; and
   generating second password metadata for the second password associated with the second component.

2. The method of claim 1, where the first password is a member of a set of passwords identified by a security policy, and where the method comprises updating each member of the set of passwords by:
   generating a set of updated passwords by concatenating respective character strings to the administrator password, where the respective character strings are generated based on respective password policies for the members of the set of passwords; and
   updating the members of the set of passwords to corresponding updated passwords.

3. The method of claim 1, where the character string is concatenated as one of a prefix and a postfix.

4. The method of claim 1, where updating the first password includes storing an encrypted version of the first updated password in a secure storage, where the encrypted version facilitates verification of future access attempts involving the first password.

5. The method of claim 1, comprising:
   detecting an attempt to access a resource secured by the first password; and
   providing the character string to facilitate granting access to the resource.

6. The method of claim 5, where the character string is provided by one of, silently concatenating the character string with an entered password, providing a user with a reminder of a password policy associated with the first password, and initializing a text entry field with the character string.

7. A system, comprising:
   a data store to store password metadata for a set of module passwords that control access to a respective set of basic input/output system (BIOS) modules, where the password metadata includes password policies for the passwords;
   an administrator password update module to facilitate modification of an administrator password of the BIOS;
   a module password update module to change members of the set of module passwords to the administrator password concatenated with character strings generated based on password policies associated with respective module passwords; and
   a detection module to detect installation of a new component of BIOS components having a module password, and to generate new password metadata associated with the new component.

8. The system of claim 7, where the password metadata includes synchronization settings for the members of the set of module passwords that indicate which members of the set of module passwords should be synchronized to the administrator password, and where the module password update module selects members of the set of module passwords to change based on the synchronization settings.

9. The system of claim 7, comprising a lockout module to preclude modification, except by the module password update module, of members of the set of module passwords that are indicated as being synchronized to the administrator password by the synchronization settings.

10. The system of claim 9, comprising a synchronization update module to allow a user to adjust which members of the set of module passwords should be synchronized to the administrator password.

11. The system of claim 7, comprising a prefix provision module to, when a user is detected as seeking to access a BIOS module protected by a member of the set of module passwords, provide the user with a provided character string generated based on password policies associated with the member of the set of module passwords.

12. The system of claim 11, where the provided character string is provided by one of, silently concatenating the provided character string with an entered password, providing a user with a reminder of a password policy associated with the member of the set of module passwords, and initializing a text entry field with the provided character string.

13. A non-transitory computer-readable medium storing processor executable instructions that, when executed, control the processor to:
   associate a first password of a first component of a basic input/output system (BIOS) with a primary password of the BIOS, where associating the first password with the primary password prevents modification of the first password except by modifying the primary password;
   detect a request to modify the primary password;
   generate first password metadata comprising a password policy for the first password associated with the first component;
   generate an updated password by concatenating a character string to the primary password, where the character string is generated based on the password policy for the first password, where the password policy identifies a set of constraints for considering the first password secure;
   update the primary password and the first password;
   detect installation of a second component of the BIOS having a second password; and
   generate second password metadata for the second password associated with the second component.

14. The method of claim 1, where the first password is associated with one of a power on password, a management engine BIOS extension password, and a drive lock password.

* * * * *